(12) United States Patent
Shin

(10) Patent No.: US 10,052,722 B2
(45) Date of Patent: Aug. 21, 2018

(54) METHODS OF FORMING HOLES AND ETCHING SURFACES IN SUBSTRATES AND SUBSTRATES FORMED THEREBY

(71) Applicant: Purdue Research Foundation, West Lafayette, IN (US)

(72) Inventor: Yung C. Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 173 days.

(21) Appl. No.: 15/222,336

(22) Filed: Jul. 28, 2016

(65) Prior Publication Data

US 2017/0028510 A1 Feb. 2, 2017

Related U.S. Application Data

(60) Provisional application No. 62/199,025, filed on Jul. 30, 2015.

(51) Int. Cl.
| | |
|---|---|
| *B29C 35/08* | (2006.01) |
| *B23K 26/362* | (2014.01) |
| *B23K 26/384* | (2014.01) |
| *B23K 26/402* | (2014.01) |
| *B23K 26/06* | (2014.01) |
| *B23K 26/0622* | (2014.01) |
| *B23K 26/361* | (2014.01) |

(Continued)

(52) U.S. Cl.
CPC ........ *B23K 26/362* (2013.01); *B23K 26/0608* (2013.01); *B23K 26/0624* (2015.10); *B23K 26/361* (2015.10); *B23K 26/384* (2015.10); *B23K 26/402* (2013.01); *B23K 2203/04* (2013.01); *B23K 2203/08* (2013.01); *B23K 2203/10* (2013.01); *B23K 2203/12* (2013.01); *B23K 2203/166* (2015.10); *B23K 2203/30* (2015.10); *B23K 2203/50* (2015.10); *B29C 59/14* (2013.01); *B29C 59/16* (2013.01); *B29C 2059/023* (2013.01); *B29C 2791/009* (2013.01); *B29K 2105/06* (2013.01); *B29K 2307/04* (2013.01)

(58) Field of Classification Search
CPC .............. B23K 26/362; B23K 26/0624; B23K 26/361; B23K 26/384; B23K 26/0608; B23K 26/402
See application file for complete search history.

(56) References Cited

U.S. PATENT DOCUMENTS

2015/0014289 A1* 1/2015 Wu ...................... B23K 26/361
219/121.85

* cited by examiner

*Primary Examiner* — Michael P Wieczorek
(74) *Attorney, Agent, or Firm* — Hartman Global IP Law; Gary M. Hartman; Domenica N. S. Hartman

(57) ABSTRACT

Methods capable of forming holes in, etching the surface of, or otherwise ablating substrates, and substrates formed thereby. A first method includes directing a first laser beam pulse towards a substrate to form a hole in a surface thereof and to form a plasma plume at least partially within the hole wherein the plasma plume has insufficient thermal energy and expansion velocity to etch sidewall of the hole, and directing a second laser beam pulse into the plasma plume to increase the temperature and expansion velocity of the plasma plume such that the sidewall is etched causing an increase in the cross-sectional dimension of the hole. A second method includes applying a liquid to a surface of a substrate, and directing a laser beam pulse into the liquid to create plasma on the surface of the substrate that etches portions of the surface of the substrate.

11 Claims, 4 Drawing Sheets

(a)

(b)

(c)

(51) Int. Cl.
*B29C 59/14* (2006.01)
*B29C 59/16* (2006.01)
*B29K 105/06* (2006.01)
*B29K 307/04* (2006.01)
*B23K 103/04* (2006.01)
*B23K 103/08* (2006.01)
*B23K 103/10* (2006.01)
*B23K 103/12* (2006.01)
*B29C 59/02* (2006.01)
*B23K 103/16* (2006.01)
*B23K 103/00* (2006.01)

METHODS OF FORMING HOLES AND ETCHING SURFACES IN SUBSTRATES AND SUBSTRATES FORMED THEREBY

CROSS REFERENCE TO RELATED APPLICATIONS

This application claims the benefit of U.S. Provisional Application No. 62/199,025 filed Jul. 30, 2015, the contents of which are incorporated herein by reference.

BACKGROUND OF THE INVENTION

The present invention generally relates to forming holes in, etching the surface of, or otherwise ablating substrates. The invention particularly relates to processes for etching surfaces of substrates and forming holes having varying diameters along their depth.

Microholes are used in numerous industrial applications, such as but not limited to, orifices in diesel engine fuel injectors and cooling holes in aerospace engines. As used herein, "microholes" are holes with average diameters in the range of ten to a few hundred micrometers (for example, 50 to 500 μm). Microholes of various cross-sectional shapes whose cross-sectional dimensions (for example, diameters or widths) vary along their lengths or depths, defined herein as "non-straight" microholes, maybe desirable in certain situations, for example, when beneficial to product performance. As a particular example, in diesel fuel injectors, non-straight microholes (for example, reverse tapered, i.e., holes having a cross-sectional dimension that increases in the direction of its depth, or converging-diverging holes, i.e., holes having a cross-sectional dimension that decreases and then increases in the direction of its depth) may enhance fuel atomization for a more complete combustion providing higher fuel efficiency and reduced emissions. As another example, non-straight microholes may yield improved cooling performance in gas turbines.

In general, it can be very challenging to drill non-straight microholes. For example, when forming a microhole with a laser beam, the cross-sectional dimensions of the microhole are often such that there is insufficient line-of-sight necessary to deliver the laser beam directly to the microhole sidewall to modify its cross-sectional dimensions in a controlled manner. Attempts have been made to drill reverse tapered microholes through electrical discharge machining (EDM) and micro electrochemical machining (ECM). However, these techniques are limited to conductive materials, as both EDM and ECM rely on the flow of electric current from the tool to the workpiece.

Further, EDM has a difficulty in producing microholes with arbitrary diameter variations (that is, microholes with nonuniform cross sectional dimensions through their depth), such as a converging-diverging hole. EDM and ECM also suffer from low efficiency and high associated costs of consumables. For example, it may take several minutes to drill one microhole using ECM, which has seriously limited its industrial applications.

Thus, there is an ongoing desire for fabrication methods capable of producing non-straight microholes in both conductive and non-conductive substrates.

BRIEF DESCRIPTION OF THE INVENTION

The present invention provides methods capable of producing non-straight microholes in both conductive and non-conductive substrates, and substrates formed thereby.

According to one aspect of the invention, a method includes directing a first laser beam pulse towards a substrate to form a hole in a surface thereof having a cross-sectional dimension at a location along a depth of the hole and to form a plasma plume at least partially within the hole wherein the plasma plume has insufficient thermal energy and expansion velocity to etch a sidewall of the hole, and directing a second laser beam pulse into the plasma plume to increase the temperature and expansion velocity of the plasma plume such that the sidewall is etched causing an increase in the cross-sectional dimension at the location in the hole.

According to another aspect of the invention, a method includes applying a liquid to a surface of a substrate, and directing a laser beam pulse into the liquid to create plasma on the surface of the substrate. The plasma etches portions of the surface of the substrate.

Other aspects of the invention include substrates produced/formed by methods comprising steps as described above.

Technical effects of methods described above preferably include the capability of forming non-straight holes, especially microholes, having one or more cross-sectional dimensions that vary along the depth of the hole, and/or the capability of etching surfaces of a substrate.

Other aspects and advantages of this invention will be better appreciated from the following detailed description.

DETAILED DESCRIPTION OF THE INVENTION

The present invention provides methods capable of forming holes in, etching the surface of, or otherwise ablating a substrate. When a high fluence laser beam ablates a target material, a plasma plume may be generated from the ablated portion of the target material and can rapidly expand in the surrounding environment. In investigations leading to certain embodiments of the present invention, it was determined that if a subsequent laser beam pulse is directed into the expanding plasma plume, the plasma may absorb sufficient energy to yield what is referred to herein as an amplified plasma plume having a significantly increased temperature and expansion velocity relative to the plasma plume prior to its interaction with the subsequent laser beam pulse.

Figure 1:
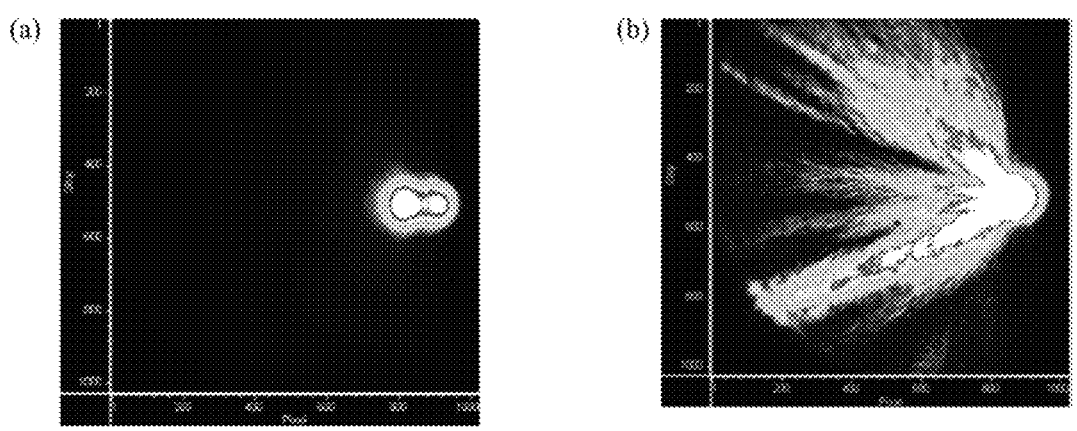
FIG. 1 includes two images showing interaction between a laser beam pulse and a plasma plume. Image (a) shows plasma generated by a first laser beam pulse, and image (b) shows the plasma after amplification with a second laser beam pulse.

In one such investigation, the interaction of a laser beam-induced plasma plume and a subsequent laser beam pulse directed thereto was investigated by generating a plasma plume with a first laser beam pulse directed at a copper substrate. The first laser beam had a wavelength of 800 nm, a duration of 100 femtoseconds, and a pulse energy of 0.9 mJ and generated a plasma plume. A second laser beam pulse having a wavelength of 800 nm, a duration of 100 femtoseconds, and a pulse energy of 0.01 mJ was then directed into the generated plasma plume. FIG. 1 includes two images (a and b) obtained with an intensified charge-coupled device (ICCD) camera. Image (a) shows the plasma plume induced by the first laser beam pulse, and image (b) shows an amplified plasma plume formed after the second laser beam pulse was directed into the plasma plume. The size and radiation intensity of the plasma plume was significantly enhanced, even though the second laser beam pulse had a much lower pulse energy which by itself would have been too low to generate the initial plasma plume.

In view of the above-noted laser beam-plasma interaction, it was concluded that the formation of an amplified plasma plume may be beneficial for forming holes, especially microholes, having one or more cross-sectional dimensions that vary along their lengths or depths. Specifically, during deep-hole drilling with a laser beam where the aspect ratio for a circular hole of depth-to-diameter is, for example, greater than 1.0, a laser-induced plasma plume may be formed and constrained by the sidewalls of the hole and thus expand primarily in the longitudinal direction of the hole. Based on this phenomenon, a process referred to herein as dual-pulse laser ablation and plasma amplification (LAPA) was considered that is capable of forming non-straight microholes in a substrate. LAPA takes advantage of the interaction between relatively short laser beam pulses and plasma generated by laser beam pulses.

Figure 2:
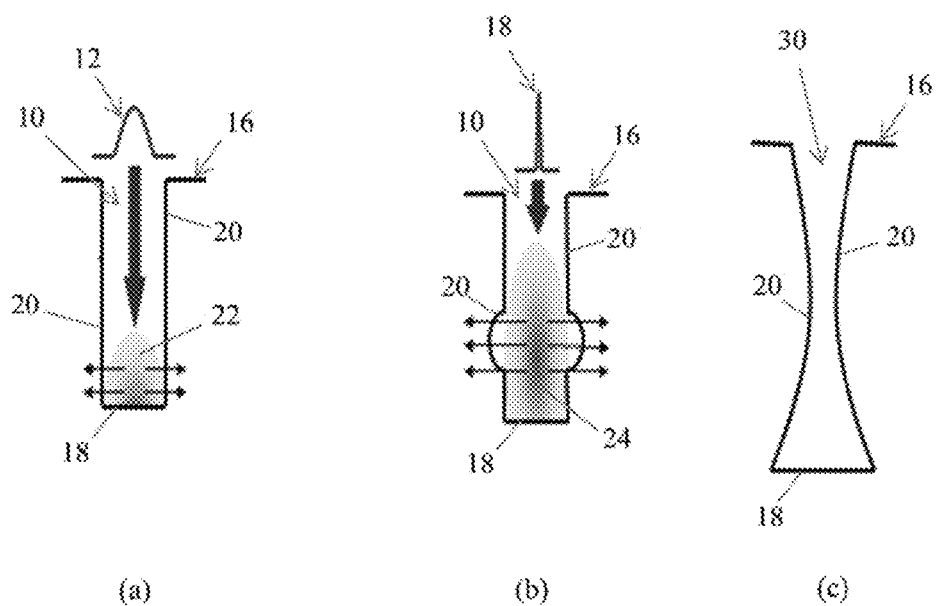
FIG. 2 includes three images schematically representing steps in a dual-pulse laser ablation and plasma amplification (LAPA) process (images a and b) and a nonlimiting microhole formed thereby (image c) in accordance with certain aspects of the invention.

FIG. 2 includes two images (a and b) that schematically represent steps for forming a hole 10 with the LAPA process. In image (a), a first laser beam pulse 12 may be directed towards a substrate 16 to ablate and thereby at least partially form a hole 10 having a length (depth) within the substrate 16. Though a different laser beam could be used, FIG. 2 represents the same laser beam pulse 12 as also producing a plasma plume 22 inside the hole 10 which may be at least partially confined within the hole 10 by its sidewalls 20. Subsequently, a second laser beam pulse 14 is directed into the plasma plume 22 to thereby produce an amplified plasma plume 24, as represented in image (b) of FIG. 2. Though it is foreseeable that only one side of the hole 10 could be affected, the amplified plasma plume 24 is represented as simultaneously ablating all sidewalls 20 of the hole 10 over a limited length of the hole 10 at a depth corresponding to the location of the plume 24 within the hole 10 to yield a change in a cross-sectional dimension (e.g., diameter) at that depth. The direction of the laser beam pulses 12 and 14 are represented by vertically downward arrows and the energy of the plasma plumes 22 and 24 directed towards the sidewalls 20 are represented with horizontal arrows.

As such, the first laser beam pulse 12 can be used to form at least a portion of the hole 10 in the depth direction and simultaneously form the first plasma plume 22, whereas the second laser beam pulse 14 is intended to vary a cross-sectional dimension of the hole 10. These two steps may be repeated as desired to form a hole 10 whose cross-section varies in a desired manner along its depth. Image (c) represents a nonlimiting example of a non-straight microhole 30 (converging-diverging) that may be formed with the LAPA process.

Variations in the cross-sectional dimensions of the hole 10 along its depth can be controlled by adjusting the power and duration of the second laser beam pulse 14 and the time delay between the first laser beam pulse 12 and the second laser beam pulse 14. The preferred power and time delay ranges may depend on the laser parameters, cross-sectional shape and area of the hole 10, substrate material, and depth of the hole 10.

The exact location where the plasma plume 22 and the second laser beam pulse 14 interact can be precisely controlled by using a controlled delay between the first and second laser pulses 12 and 14, and the predicted expansion velocity of the plume 22. The resultant amplified plasma plume 24 may then expand in all directions and create an effect of what is referred to herein as plasma etching on the confining sidewalls 20 by transferring the thermal energy from the amplified plasma plume 24 to the relatively cooler sidewalls 20 and subsequently ablating and/or evaporating the material of the sidewalls 20, while highly energized ions and atoms in the amplified plasma plume 24 may also bombard the surface of the sidewalls 20 ejecting some atoms therefrom. This preferably provides the capability of controllably forming predetermined cross-sectional dimensions of the hole 10 along its depth. Further, by controlling the intensity and relative timing of the second laser beam pulse 14, cross-sectional dimensions of the hole 10 at different locations along its depth can be selectively modified.

In order to promote high quality sidewalls which generally maintain the material properties of the substrate prior to forming the hole 10 (as opposed to altered material properties due to heating), the heat affected zone (HAZ) is preferably kept as small as possible by limiting the duration of plasma-sidewall heat flux. This may be achieved by controlling the intensity and duration of the first and second laser beam pulses 12 and 14, and thereby controlling the energy and duration of the amplified plasma plume 24.

Preferably, the first laser beam pulse 12 has an intensity and duration sufficient to ablate the bottom 18 of the hole 10 in the depth direction and sufficient to create the plasma plume 22, which itself has insufficient energy and expansion velocity to etch the sidewalls 20 of the hole 10, but has sufficient energy that once amplified with the subsequent laser beam pulse 14 is capable of etching the sidewalls 20. The second laser beam pulse 14 preferably has an intensity and duration sufficient to amplify the plasma plume 22 such that the amplified plasma plume 24 is capable of etching the sidewalls 20, but which are low enough such that the second laser beam pulse 14 does not create a large HAZ which could significantly decrease the quality of the etched sidewalls 20. During the LAPA process, it may be that the quality of the bottom of the hole 10 is relatively inconsequential, since once the LAPA process has been completed, the quality of the bottom 18 of the hole 10 may subsequently be improved with further laser pulse ablation, or the bottom 18 of the hole 10 may be removed entirely to form a through-hole.

As a nonlimiting example, for microholes having an average diameter of about 50 to 500 μm, experimental investigations indicated that relatively longer laser beam pulses, for example, those generated by commercially available nanosecond lasers, met the preferred requirements noted-above for the first laser beam pulse 12. Relatively shorter laser beam pulses, for example, those generated by commercially available picosecond lasers and femtosecond lasers, generally did not induce plasma plumes with total energy contents which were effective in ablating sidewalls of microholes upon amplification. Therefore, the first laser beam pulse, intended to form the first plasma plume, may be generated with a nanosecond laser. However, it is foreseeable that a particularly high energy femtosecond or picosecond laser may be capable of forming a plasma plume with sufficient energy that once amplified with the subsequent laser beam pulse is capable of etching the sidewalls.

Plasma plumes induced by longer laser beam pulses generated by nanosecond lasers were determined to yield a long plasma heat flux duration likely resulting in a large HAZ in the sidewall due to their relatively long duration. In contrast, the shorter laser beam pulses generated with picosecond lasers and femtosecond lasers were capable of sufficiently amplifying the plasma plume without creating a large HAZ. Therefore, the second laser beam pulse, intended to form the amplified plasma plume, may be generated with a picosecond laser or femtosecond laser.

Figure 3:
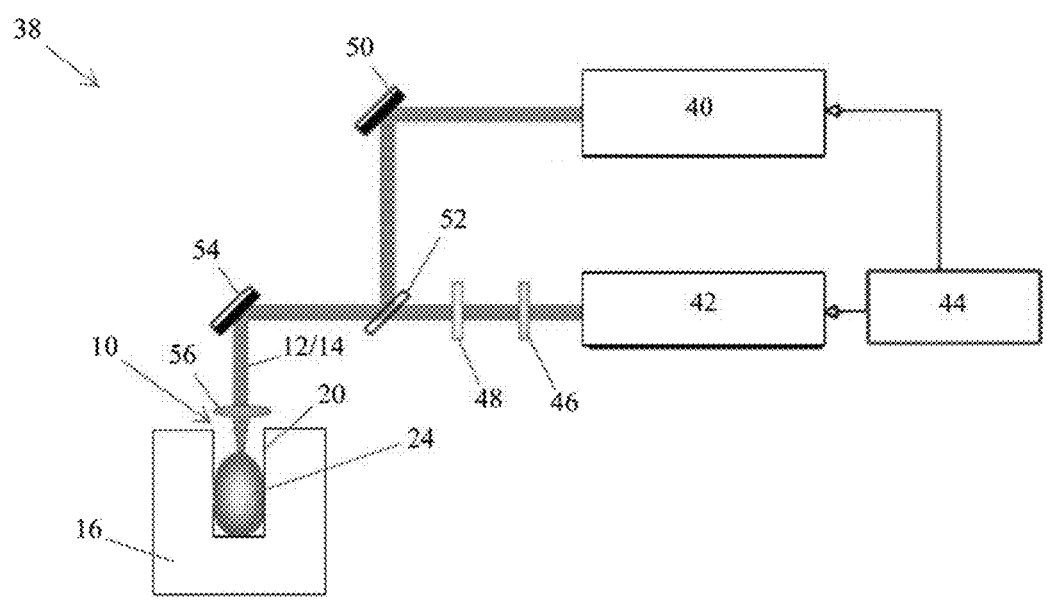
FIG. 3 schematically represents a nonlimiting system capable of performing a dual-pulse laser ablation and plasma amplification (LAPA) process in accordance with certain aspects of the invention.

FIG. 3 schematically represents a nonlimiting system 38 capable of performing LAPA. The system 38 includes first and second lasers 40 and 42 capable of generating the first and second laser beam pulses 12 and 14, respectively. During operation, a delay generator 44 provides a controlled delay between activation of the first laser 40 and the second laser 42. Although other configurations are foreseeable and within the scope of the invention, the system 38 is represented as including a half-wave plate 46, a polarizer 48, a mirror 50, a harmonic separator 52, a mirror 54, and a focusing lens 56 configured to provide the first and second laser beam pulses 12 and 14 to a hole 10 in the substrate 16. As such, the system 38 is capable of creating an amplified plasma plume 24 the hole 10 to ablate the sidewalls 20.

In view of the above, LAPA provides a method capable of fast, cost-effective, and high-quality manufacturing of non-straight holes (as defined herein). The process is not substrate specific, in that holes may be formed with lasers in both conductive and non-conductive materials. Nonlimiting examples of conductive materials for which the methods of this disclosure are particularly applicable include various metals and alloys such as copper and its alloys, high temperature alloys, aluminum and its alloys, and iron and its alloys including steel. Nonlimiting examples of non-conductive materials for which the methods of this disclosure are particularly applicable include ceramics such as silicon carbide, alumina, silicon nitride, and partially-stabilized zirconia. The process is also not limited to any particular hole geometries, and hole cross sections may be predetermined (for example, if the sidewalls of a hole are relatively uniformly ablated to a desired dimension) or arbitrary (for example, if the sidewalls of a hole are ablated more in one direction than another to result in a nonuniform cross sectional dimension). In fact, it is within the scope of the invention that with proper adjustment of laser parameters, time delays, and pulse durations, the cross-sectional geometry of a hole can be varied throughout its depth. As such, LAPA may have a broad impact on a wide variety of applications, including but not limited to fuel efficiency improvement and the reduction of toxic gas emissions to the environment when applied to diesel engine fuel injectors and micro cooling holes in aerospace engines.

In accordance with additional aspects of the invention, laser-induced plasma may be used to etch surfaces of a substrate, and is particularly useful in etching a matrix material in a composite, such as but not limited to a carbon fiber composite. A plasma plume may be formed on a surface of the substrate such that thermal energy from the plasma preferably ablates, etches, and/or evaporates portions of the surface of the substrate. According to one nonlimiting embodiment, the plasma may be formed by directing a laser beam pulse towards a liquid, preferably water, on the surface to be etched.

During an experimental investigation leading to certain embodiments of the present invention, a composite substrate comprising carbon fibers suspended in a polymer matrix was etched with laser induced plasma. Since the polymer matrix was located between the carbon fibers, the polymer matrix could not be easily removed by a laser beam directly. The surface was covered with water and a laser beam was directed into the water at the surface to yield a laser-induced water breakdown plasma. The laser beam had a power density of between 30 and 70 $GW/cm^2$ and was focused three millimeters from the substrate. Between one and fifty pulses were used to etch a depth of about 300 microns into the polymer matrix material. Since water has lower breakdown threshold than air, the resulting plasma may have a relatively higher thermal energy.

Figure 4:
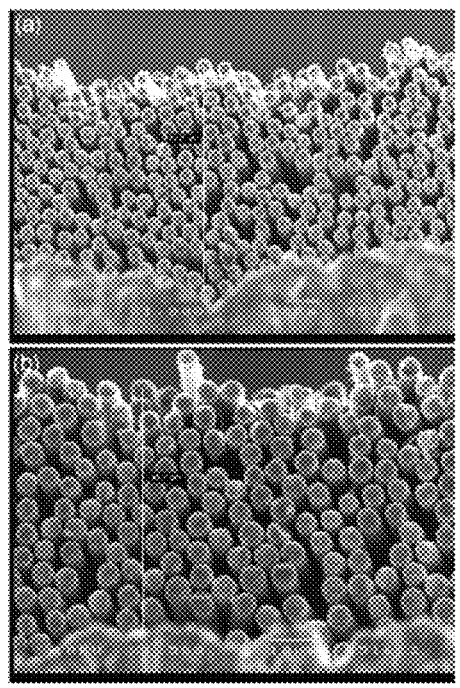
FIG. 4 includes two images showing a composite substrate comprising carbon fibers in a polymer matrix that has been etched with laser-induced plasma.

FIG. 4 includes two images (a and b) that show the composite after the surface was etched. As shown, the plasma etched portions of the polymer matrix while leaving the carbon fibers intact. Image (b) of FIG. 4 shows a higher magnification of the composite, showing voids in the substrate that were previously occupied by polymer matrix material prior to etching.

The polymer matrix material was removed due to melting and/or vaporization induced by the thermal energy transfer from the plasma to the substrate. The carbon fibers remained intact, indicating a higher damage threshold (for example, higher melting temperature) by the plasma than the polymer matrix. Thus, FIG. 4 indicates that laser-induced plasma may be used to remove selectively material from a substrate, including but not limited to a polymer matrix material from a composite.

Laser beam systems capable of generating laser beam pulses in the methods described above (including but not limited to nanosecond, picosecond, and femtosecond lasers) are well known and therefore will not be described in any detail. It is foreseeable that more than one laser may be used for performing the processes.

While the invention has been described in terms of specific embodiments, it is apparent that other forms could be adopted by one skilled in the art. For example, the physical configuration of a substrate and hole could differ from those shown, and materials and processes/methods other than those noted could be used. Therefore, the scope of the invention is to be limited only by the following claims.

The invention claimed is:

1. A method comprising:
   directing a first laser beam pulse towards a substrate to form a hole in a surface thereof having a cross-sectional dimension at a location along a depth of the hole, and to form a plasma plume at least partially within the hole, the plasma plume having insufficient thermal energy and expansion velocity to etch a sidewall of the hole; and
   directing a second laser beam pulse into the plasma plume to increase the temperature and expansion velocity of the plasma plume such that the sidewall is etched causing an increase in the cross-sectional dimension at the location in the hole.

2. The method of claim 1, wherein the first laser beam pulse has an intensity and duration sufficient to ablate a bottom of the hole in a depth direction, and sufficient to create the plasma plume which has insufficient energy and expansion velocity to etch the sidewall of the hole, but has sufficient energy that once amplified with the second laser beam pulse, etches the sidewall.

3. The method of claim 1, wherein the second laser beam pulse has an intensity and duration sufficient to amplify the plasma plume such that the plasma plume etches the sidewall, but are low enough such that the second laser beam pulse does not create a HAZ in the sidewall.

4. The method of claim 1, wherein the hole is a microhole.

5. The method of claim 1, wherein the substrate is formed of a conductive material.

6. The method of claim 1, wherein the substrate is formed of a non-conductive material.

7. The method of claim 1, further comprising controllably delaying the second laser beam pulse such that the sidewall is etched in a predetermined location along the depth of the hole.

8. The method of claim 1, further comprising controlling an intensity of the first and second laser beam pulses such that the cross-sectional dimension at the location in the hole is increased to by a predetermined amount.

9. The method of claim 1, further comprising repeatedly directing the first and second laser beam pulses into the hole so that the hole has varying cross-sectional dimensions at locations along the depth of the hole.

10. The method of claim 1, further comprising directing a third laser beam pulse into the hole to ablate a bottom surface of the hole such that the hole is a through-hole in the substrate.

11. The method of claim 1, wherein portions of the sidewall in the hole are not etched and the hole has a cross-sectional dimension that varies along the depth of the hole.

* * * * *